United States Patent Office 3,466,373
Patented Sept. 9, 1969

3,466,373
ANALGESIC AND ANTI-INFLAMMATORY COMPOSITION CONSISTING ESSENTIALLY OF 2-(2,3-XYLYLAMINO)-NICOTINIC ACID
Charles Hoffmann, Enghien-les-Bains, Val-d'Oise, and André Faure, Paris, France, assignors to Laboratories U.P.S.A., Gennevilliers, France, a corporation of France
No Drawing. Continuation-in-part of application Ser. No. 418,539, Dec. 15, 1964. This application June 19, 1968, Ser. No. 738,075
Claims priority, application Great Britain, Dec. 19, 1963, 50,274/63; Mar. 25, 1964, 12,723/64; France, Sept. 23, 1966, 77,487
Int. Cl. A61k 27/00
U.S. Cl. 424—266                1 Claim

ABSTRACT OF THE DISCLOSURE

Pharmaceutical compositions containing a compound of Formula I

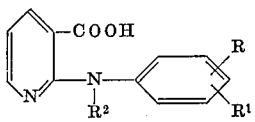

have analgesic and anti-inflammatory activity useful in the treatment of gout, rheumatic pelvi-spondylitis, polyarthritis, inflammatory rheumatism of other origins, arthritis of the vertebral column and limbs, and rheumatic pains such as occur in lumbago, torticollis and phlebitis. In the formula, R is hydroxy, lower alkyl or halo-substituted-lower-alkyl, for instance, trifluoromethyl, lower alkoxy, carboxy, carboalkoxy from lower alkyl groups or halogen. $R^1$ is hydrogen, hydroxy, lower alkyl or haloalkyl of 1–4 carbon atoms, alkoxy from lower alkyl groups, carboxy, carboalkoxy from lower alkyl groups or halogen. $R^2$ is hydrogen or alkanoyl of 1–4 carbon atoms. Also non-toxic salts may be used.

---

This application is a continuation-in-part of Ser. No. 418,539, filed Dec. 15, 1964, now Patent No. 3,415,834 granted Dec. 10, 1968.

This invention relates to analgesic and anti-inflammatory pharmaceutical compositions containing as the active analgesic and anti-inflammatory ingredient an effective amount of at least one substituted nicotinic acid of Formula I

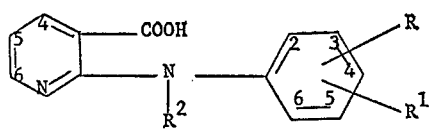

in which R is hydrovy, lower alkyl of 1–4 carbon atoms, or haloalkyl of 1–4 carbon atoms, for instance the trifluoromethyl group, alkoxy of 1–4 carbon atoms, carboxy, carboalkoxy of 1–4 carbon atoms or halogen; $R^1$ is hydrogen, hydroxy, alkyl of 1–4 carbon atoms, haloalkyl of 1–4 carbon atoms, alkoxy of 1–4 carbon atoms, carboxy, carboalkoxy of 1–4 carbon atoms or halogen; $R^2$ is hydrogen or an acyl group, preferably a lower alkanoyl group, containing not more than 4 carbon atoms. The phenyl group may be further substituted by one or more lower alkyl groups.

It will be observed that the compounds useful in the present invention are 2-anilino derivatives of nicotinic acid in which the nicotinic acid nucleus is un-substituted in the 4-, 5-, and 6-positions, and the phenyl group of the aniline moiety is substituted in at least one position and usually in at least two positions. The nitrogen atom of the aniline portion may also be substituted by lower alkanoyl, e.g. propionyl. The invention also includes the water-soluble physiologically acceptable salts of the compounds of Formula I.

One group of valuable compounds falling within the scope of Formula I above, are compounds in which R is hydroxy, alkyl of 1 to 4 carbon atoms, trifluoromethyl, alkoxy of 1 to 4 carbon atoms, carboxy or carboalkoxy of 1 to 4 carbon atoms or chlorine; $R^1$ is hydrogen, hydroxy or alkyl of 1–4 carbon atoms and $R^2$ is hydrogen or alkanoyl of 1–4 carbon atoms.

Another group of compounds useful in the present invention are those in which $R^2$ is hydrogen and R is in the 2- or ortho position and is lower alkyl, halogen-substituted-lower-alkyl, lower alkoxy or halogen, and $R^1$ is in the 3-position and is hydrogen, hydroxy, lower alkyl, lower alkoxy, carboxy or carboalkoxy from alkyl of 1–4 carbon atoms.

Still another group of compounds within the scope of this invention are those in which $R^1$ and $R^2$ are both hydrogen and R is in the 3-position of the aniline nucleus and is other than the trifluoromethyl group.

Still another group of compounds within the scope of the present invention are those in which R and $R^1$ are in the 3- and 5-positions of the aniline nucleus respectively and in which $R^2$ is hydrogen, that is, compounds of Formula II below

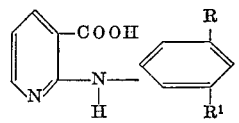

The novel compounds for use in this invention have analgesic and anti-inflammatory activity and may be applied to the treatment of gout, rheumatic pelvic-spondylitis, polyarthritis, inflammatory rheumatism of other origin, arthritis of the vertebral column and limbs, rheumatic pains, such as occur in lumbago, torticollis and phlebitis. Particularly valuable are the pharmaceutical compositions having as their effective active agents:

2-(3-trifluoromethylanilino)-nicotinic acid,
2-(2,3-xylylamino)-nicotinic acid,
2-(2,6-xylylamino)-nicotinic acid,
2-(p-methoxyanilino)-nicotinic acid,
2-(p-ethoxyanilino)-nicotinic acid,
2-(o-methyl-p-chloroanilino)-nicotinic acid,
2-(o-hydroxyanilino)-nicotinic acid,
2-(p-carbomethoxy-m-hydroxyanilino)-nicotinic acid,
N-propionyl-2-(2,3-xylylamino)-nicotinic acid and
2-(p-chloro-o-hydroxyanilino)-nicotinic acid.

A suitable method of preparation of the compounds used in the compositions of the present invention is disclosed in said copending application Ser. No. 418,539 and resides in the condensation of a 2-halo nicotinic acid with a substituted aniline of Formula III

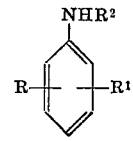

wherein R, $R^1$ and $R^2$ are as defined above, preferably in the presence of copper powder or potassium iodide as a catalyst and with or without the presence of a solvent. If desired, the resulting 2-anilino nicotinic acid may then be converted into a water-soluble salt by conventional methods.

In the said copending application referred to above, the method of preparation of compounds of Formula I, in which $R^2$ is lower alkanoyl residing in the alkanoylation of the corresponding compound of Formula I in which $R^2$ is hydrogen, is also disclosed. This alkanoylation may be conducted with an alkanoyl halide or an anhydride in the presence of an acid binding agent. Compounds in which R is carboxy, may be prepared, as already described in the copending application Ser. No. 418,539, by hydrolysis of the corresponding compound of Formula I, in which R is a carboalkoxy group.

The sodium salt of 2-(2,3-xylylamino)-nicotinic acid, is described in the copending application and is suitable for use in pharmacodynamic and clinical experiments. It is soluble in water and crystallizes with one molecule of water of crystallization. This sodium salt may be dried completely by heating to about 170° C. The substance melts at about 260° C. Pharmacological tests described more in detail below, demonstrate that it has good analgesic activity accompanied by a satisfactory therapeutic index and moreover, that it exhibits significant anti-inflammatory activity.

The invention comprises analgesic and anti-inflammatory pharmaceutical compositions containing as active agent an effective amount of at least one of the compounds of Formula I and/or a non-toxic salt thereof in association with a pharmaceutically acceptable carrier or vehicle compatible therewith. Such compositions may also contain other active compounds with which they are compatible, such as proteolytic enzymes, analgesics, antihistaminics, antibiotics, and other anti-inflammatory substances.

The following pharmaceutical forms are especially suitable: tablets, gelatin-coated pills, dragees, and capsules, each preferably containing 100 to 500 milligrams of active substance and liquid compositions for oral administration, such as syrups. Other useful compositions include: suppositories, each containing 200 to 500 milligrams of active substance; sterile injectable liquids, conveniently dispensed in ampules of 2 to 5 cubic centimeters, each containing 100 to 600 milligrams of active substance suitable for administration by the parenteral route; and creams and lotions containing 2 to 10% of active substance. They may be made by methods known per se in the art.

The analgesic activity of 2-(2,3-xylylamino)-nicotinic acid was determined by the Siegmund test and the Eddy test. In the former test, mice are injected intraperitoneally with 0.25 ml. of an aqueous alcoholic solution of phenylbenzoquinone so as to produce fits. It was found that a dose of 54 mg./kg. of the compound under test prevents the occurrence of fits in 50% of the test animals. This inhibitory effect is significant at a dose of 10 mg./kg. and a dose of 100 mg./kg. suppresses all fits.

In the Eddy test the mice are placed on a heated plate at 64–67° C. It was found that the product of the invention exerts its maximum effect 60 minutes after administration. A dose of 25 mg./kg. prolongs slightly the time before which the mice begin to lick their paws. This time is doubled by an oral dose of 200 mg./kg.

The anti-inflammatory activity of 2-(2,3-xylylamino)-nicotinic acid was determined as follows. In the first test, the activity of the compound in suppressing oedema produced in the tibio-tarsial region of the rat by injection of irritant substances such as 3% Formalin, 6% dextran or 2 μg. of bradykinin, was determined. The product of the invention has a strong anti-inflammatory activity at a dose of 100 mg./kg. against all the irritant substances used.

The compound was also found to have a strong inhibitory effect on the formation of granuloma tissue and exudate provoked by the implantation of pellets impregnated with a 1% solution of carrageenin. An oral dose of 100 mg./kg. produced a 41% inhibition and a dose of 200 mg./kg. produced a 61% inhibition.

Doses from 50–200 mg./kg. of the 2-(2,3-xylylamino)-nicotinic acid had no effect on the behavior of mice nor gave rise to any motor disturbance.

The analgesic and anti-inflammatory activity of the compounds of this invention have been determined clinically. In particular, the compound, 2-(2,3-xylylamino)-nicotinic acid, has been administered orally in different inflammatory conditions, and in particular the following: acute and chronic gout; rheumatic pelvi-spondylitis; chronic rheumatoid polyarthritis; and phelebitis. The following case histories illustrate the results obtained with 2-(2,3-xylylamino)-nicotinic acid.

Antoine L., 49 years old

This patient had established gout which had been treated continuously in conventional manner using a known anti-inflammatory agent and colchicine. The treatment was continued but replacing the known anti-inflammatory agent with the above 2,3-xylylamino compound. The regimen was as follows: the first two days of the week, two pills of colchicine, each containing 1 mg., were administered; the five following days, 500 mg. of the above compound were administered orally at each meal. The treatment was continued for several weeks. The compound of the invention was excellently tolerated, and its substitution for the known anti-inflammatory did not lead to the reappearance of crises.

Bernard L., 53 years old

This patient had gout which had been treated for 12 months with prednisolone at a daily dose of 20 mg. The steroid treatment was discontinued by substituting a daily intravenous injection of colchicine and a daily intramuscular injection of phenylbutazone every day for eight days. On the ninth day, this regimen was replaced by combination of the compound, 2-(2,3-xylylamino)-nicotinic acid, with colchicine. The new treatment was well tolerated, and the patient's condition was stabilized. The patient, not only did not suffer from pains in the joints, but the functions of the joints were greatly improved.

Jean H., 45 years old

This patient had had a polyarthric tophaceous gout affecting toes, ankles and knees with frequent crises, about ten a year. Despite a relatively slightly raised uricemia (6.5 mg. percent), various uricosuric substances had been used without result. He was treated with 2-(2,3-xylylamino)-nicotinic acid and colchicine for two months. The treatment was well tolerated and the patient experienced no new crisis during these two months, although such crises had recurred regularly during the preceding years.

Marcel B., 28 years old

This patient had a polyarthritic gout with fourteen or fifteen crises a year, necessitating prolonged absences from work. Each crisis had been treated with phenylbutazone, by intramuscular injection or suppository, which cured the crisis but did not prevent its return. For three months, the patient was treated with 2-(2,3-xylylamino)-nicotinic acid together with colchicine, and no new crisis occurred. The tolerance was good.

Jeanne H., 42 years old

The patient had suffered for two years from rheumatic pelvi-spondylitis, and had been treated successfully by two separate intramuscular injections per week of phenylbutazone. 250 mg of 2-(2,3-xylylamino)-nicotinic acid, administered orally, taken each day with the midday meal were substituted for the injections of phenylbutazone. The tolerance was excellent, the results were good and the change of treatment did not alter the sedimentation rate.

Danielle L., 22 years old

This patient had had for a year local pains in the joints of the ankles and knees caused by urates, and lumbago for three months. A radiographic examination showed characteristic injury of the sacro-iliac joints with reduction of the cartilages and thickening of the sides of the joints. The sedimentation rate was 35/64. The patient was diagnosed to be suffering from pelvi-spondylitis. Treatment with 250 mg. of the above compound given orally three times a day, morning, midday and evening, was prescribed for a month. It was very well tolerated and the patient's condition was much improved. The sedimentation rate improved to 26/45.

Alice D., 60 years old

This patient showed multiple injury to the joints, deformities, a continuous subfebrile state, anemia, and a loss of weight of about 10 kg. The sedimentation rate was 80/120, and the reaction to the Waaler-Rose test was positive. In addition to rest and a synthetic antimalarial, the chronic rheumatoid polyarthritis was treated with 250 mg of 2-(2,3-xylylamino)-nicotinic acid orally, three times a day at mealtimes. After two months of treatment, the inflammation of the joints was reduced, the movement of the joints was easier, the subfebrile state disappeared, the patient had gained weight, and the sedimentation rate had improved to 50/76. This result is very remarkable in view of the extreme gravity of the patient's initial state.

Colette L., 58 years old

This patient had chronic rheumatic polyarthritis which had begun in an atypical manner characterized by diffuse decalcification of the foot, followed within six months by an infectious syndrome giving rise to intermittent fever. The patient lost nearly 18 kg. weight, was anemic, and was obliged by the pain to keep to her bed. The sedimentation rate was 120/135, and electrophoresis of the blood showed abnormally large amounts of alpha-2- and gamma-globulins without however the very large amount of gamma-globulins characteristic of Kalher disease. Because of the polyarthritic injury, the recent injury to the metocarpophalanges and the proximal interphalanges, the condition was diagnosed as a very evolved form of chronic rheumatic polyarthritis. The patient was treated with 750 mg. of 2-(2,3-xylylamino)-nicotinic acid per day, orally, a synthetic antimalarial, calcium, and ambivalent sex hormones. In two-and-one-half months the patient's condition had been transformed. The fever had ceased. The appetite and weight had been regained. The condition of the joints had improved. The sedimentation rate had improved to 55/80. The tolerance of the treatment was excellent. This result is the more remarkable, because when antimalarials are used alone, they generally cause a slight delay in improvement, while in the case reported, the improvemnt was very rapid, and as early as the fifteenth day, the effect of the treatment was already markedly favorable.

Marie R., 60 years old

This woman had phlebitis in her left leg and also had a large hiatal hernia with which the phlebitis was connected. The above xylyl compound was administered with anticoagulants, and the gastric tolerance of the treatment was excellent. The inflammatory phenomena improved more rapidly than usual, with a fall in temperature and normalization of the blood picture.

Charles D., 65 years old

This man had phlebitis in his right leg without any detectable point of entry. No neoplasm could be detected. The above xylyl compound was administered with anticoagulants, and the treatment was then very well tolerated. It had a favorable action on the patient's temperature, hastened the cure of the venous thrombosis and led to normalization of the blood count and formula.

Henri L., 58 years old

This patient had been hospitalized for an acute pneumopathy, and received the compound, 2-(2,3-xylylamino)-nicotinic acid together with antibiotics. The treatment produced a favorable effect.

Also the compound 2-(3-trifluoromethyl-anilino)-nicotinic acid of formula

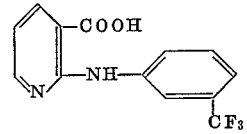

has been extensively investigated. The substance is prepared according to the procedure described in detail in the copending application Ser. No. 418,539, that is, by condensation of 2-chloro-nicotinic acid and 3-trifluoromethyl aniline. The substance exihibits very interesting analgesic and anti-inflammatory activity. Also this substance may be incorporated into pharmacological compositions in which, in addition to the active ingredient, there may be present other active compounds with which it is compatible, such as, proteolytic enzymes, analgesics, antihistaminics, antibiotics, and other anti-inflammatory substances. As already mentioned above, the substance is advantageously administered in the form of tablets, gelatin-coated pills, dragees and capsules, each preferably containing between 100 and 500 mgs. of the active substance.

The substance may also be administered in the form of liquid compositions, for instance, syrups, suitable for oral administration. The substance may also be administered in the form of suppositories each containing between 200 and 500 mgs. of the substance or in the form of sterile injectable liquids in ampules containing between 2 and 5 cubic centimeters of liquid in which the active ingredient is present in the amount of between 100 and 600 mgs. The ampules are suitable for administration by the parenteral route. It is also possible to administer the substance in the form of creams or lotions suitable for topical application containing between 2 and 10% of the active ingredient.

For the pharmacodynamic study of the 3-trifluoromethyl compound, the active substance itself, that is, the free 2-(3-trifluoromethyl-anilino)-nicotinic acid which crystallizes in the form of yellow needles of melting point 204° C., has been used. Also gelatin-coated pills, each weighing about 0.307 gm. have been used of the composition shown hereinbelow:

|  | G. |
|---|---|
| 2-(3-trifluoromethylanilino)-nicotinic acid | 0.250 |
| Excipients: |  |
| Talc | 0.025 |
| Maize starch | 0.025 |
| Magnesium stearate | 0.007 |

For the sake of simplicity, the active ingredient is referred to hereinafter with the designation UP 83. The investigation has been extended, not only to pharmacological tests, but also to acute and chronic toxicity studies and to investigation of the teratogenic action.

I. PHARMACOLOGICAL STUDIES

A. Anti-inflammatory action (1) STUDY ON THE EDENA OF RAT'S JAW

These studies have been conducted with groups of 12 animals.

(a) Edema brought about by the administration of dextran.—For this study a plantar edema is induced by injection of 0.5 cc. of a 6% solution of dextran in the tibiotarsial joint or under the plantar aponeurosis. This injection causes a considerable increase in volume of the paw as compared with the initial volume. The active ingredient UP 83 is then administered orally and the increase in volume of the paw, in percent, with respect to the initial volume, is determined after periods of 1.5 hours and 3 hours respectively. The results are tabulated below:

| Volume changes following administration of UP 83, mg./kg. administered | Percent increase in volume of the paw, with respect to initial volume, after— | |
| --- | --- | --- |
| | 1.5 hours | 3 hours |
| 0 | 100 | 69 |
| 50 | 76 | 69 |
| 100 | 86 | 61 |
| 200 | 52 | 38 |

The above data demonstrate that the increase in volume of the paw declines significantly after administration of UP 83. The data also show a greater decrease in volume after 3 hours than after 1.5 hours.

(b) Edema caused by the injection of carrageenin.—The same technique discussed above is used for the injection of a 2% solution of carrageenin. UP 83 is administered orally. The percent increase in volume of the paw is also measured after 1.5 hours and after a period of 3 hours. The results are tabulated below:

| Volume changes following administration of UP 83, mg./kg. administered | Percent increase in volume of the paw, with respect to initial volume, after— | |
| --- | --- | --- |
| | 1.5 hours | 3 hours |
| 0 | 58.6 | 58.6 |
| 50 | 58.6 | 55 |
| 100 | 45 | 45 |
| 200 | 20 | 24 |
| 400 | 14 | 10 |

The administration of UP 83 is useful in decreasing the volume of the paw in the edema caused by the injection of carrageenin.

(2) EFFECT OF ADMINISTRATION OF UP 83 ON PLEURISY (a) Pleurisy caused by the injection of silver nitrate.—Groups of 8 rats of weight between 160–180 gms. each, are anesthetized with ether. Then an intrapleural injection on the right side of 1.5 cc. of air is given, and without moving the needle, a 0.3 cc. of 0.2% silver nitrate solution is injected into each animal. The animals are killed 8 hours after the injection, the chest is opened and the liquid formed is removed and measured. The active substance UP 83 is administered by the oral route one hour before the silver nitrate injection. The amount of active ingredient, the volume of the exudate and the percent inhibition, are tabulated below:

| Mg./kg. of UP 83 administered | Volume of Exudate | Percent Inhibition |
| --- | --- | --- |
| 0 | 1.9±0.12 | |
| 25 | 1.7±0.19 | 10 |
| 50 | 1.3±0.27 | 31.5 |
| 100 | 1.1±0.22 | 42.1 |
| 200 | 0.8±0.10 | 58 |

The animals kept as controls showed an average of 1.9 of volume of exudate which when compared with the treated animals showed a definite correlation between the increase in the amount of the active substance and the decrease in the volume of exudate, with a corresponding progressive increase in the percent inhibition.

(b) Pleurisy induced by Evans' blue.—The same technique as described above is used for the injection of 5 cc. of a solution containing one part of Evans' blue per 1000 and the results are similarly tabulated below:

| Mg./kg. of UP 83 administered | Volume of Exudate | Percent Inhibition |
| --- | --- | --- |
| 0 | 4.8±0.24 | |
| 50 | 3.7±0.38 | 23 |
| 100 | 2.5±0.31 | 48 |
| 200 | 1.2±0.04 | 73 |

Again, it is shown that a correlation exists between the increase in the amount of substance administered and the decrease in the volume of exudate and increase in percent inhibition. A dose of 50 mg./kg. of UP 83, by the oral route, or higher is satisfactory in effectively decreasing the volume of exudate.

(3) PERITONITIS IN THE RAT (a) Peritoniti caused by injection of formaldehyde.—For this test, 1 cc. of a 1% solution of formaldehyde is injected intraperitoneally in male rats in groups of 6 animals, each weighing between 130–160 gms. The substance UP 83 is administered 30 minutes before the injection. At the end of a 7 hour period, the animals are killed and the intraperitoneal liquid is removed and the volume determined. It is possible in this manner to determine the percent inhibition of exudate in the treated animals by comparison with the animals kept as control.

| Mg./kg. of UP 83 administered per os | Volume of Exudate | Percent Inhibition |
| --- | --- | --- |
| 0 | 2.54±0.25 | |
| 50 | 2.20±0.40 | 13.3 |
| 100 | 1.63±0.20 | 35 |
| 200 | 1 ±0.12 | 60 |
| 400 | 0.70±0.54 | 72 |

A definite correlation exists between the amount of active substance being administered and the volume of exudate.

(b) Reabsorption of Ringer's solution.—This test is conducted in the following manner. A predetermined dose of UP 83 is administered to male rats in groups of six, weighing each between 120–140 gms. Thirty minutes later, 10 cc. of Ringer's solution is injected intraperitoneally. Three hours later, the animals are killed and the volume of the peritoneal liquid is measured. The percent inhibition is determined in the treated animals by comparison with the animals kept as control.

| Mg./kg. of UP 83 administered per os | Volume of Exudate | Percent Inhibition |
| --- | --- | --- |
| 0 | 2±0.16 | |
| 12.5 | 1.9±0.15 | 5 |
| 25 | 1.5±0.24 | 25 |
| 50 | 1.73±0.21 | 19.5 |
| 100 | 0.88±0.20 | 56 |
| 200 | 0.66±0.14 | 67 |
| 400 | 0.45±0.14 | 77 |

The data above demonstrate unequivocally that the volume of exudate decreases upon administration of UP 83 and the decrease is proportional to the amount of the substance being administered.

B. Analgesic action (1) EDDY'S METHOD

This test is conducted with groups of fourteen mice of weight between 18 and 20 gms. each, which are placed on a hot plate, the plate being kept at a constant temperature by means of refluxing methanol. The length of time between the initial placing of the mice on the plate and the time when they first exhibit symptons of pain, is determined and compared with control animals. For the control animals, this period of time has been measured with five groups of fourteen mice and has been determined to be 4.7 seconds. The table below summarizes the results obtained after administration of UP 83 by the oral route, and the time interval measured after (1) 30 minutes, (2) 1 hour and (3) 2 hours.

| Mg./kg. of UP 83 administered | Time interval in seconds, before manifestation of pain upon administration of UP 83, after— | | |
|---|---|---|---|
| | 30 minutes | 1 hour | 2 hours |
| 20 | 6.80 | 5.65 | 6 |
| 40 | 7.55 | 6.75 | 6.75 |
| 80 | 7.20 | 6.60 | 6.90 |
| 160 | 7.80 | 7.20 | 6.70 |
| 320 | 9.35 | 8.30 | 8.10 |

Manifestly, the substance UP 83 exhibits considerable analgesic activity as evidenced by the increase in time intervals before the animals exhibit evidence of pain.

(2) RANDALL AND SELITTO'S METHOD

The test is conducted in the following manner. The rats used for the tests are selected by first applying an increase in pressure to the animals at the level of the tibiotarsial joint and measuring the pressure by a manometer and selecting for the test only those animals which manifest pain, as evidenced by a squeaky sound, when the pressure being applied is lower than 200 millimeters of mercury. The animals are then divided into groups of 12 and a 0.1 cc. of a suspension of 20% Brewer's yeast is injected in each animal under the plantar aponeurosis. After 2 hours, UP 83, or a physiological serum, is administered to the animals by the oral route, then the pressure which the animals are capable of withstanding is determined at both 1 and 2 hour intervals after administration of the substance. The results are tabulated in the table below and are expressed in millimeters of mercury.

| Mg./kg. of UP 83 administered | Number of rats | Pressure required to obtain manifestation of pain, after— | |
|---|---|---|---|
| | | 1 Hour | 2 Hours |
| 0 | 102 | 94 | 82 |
| 25 | 6 | 107 | 111 |
| 50 | 12 | 139 | 144 |
| 100 | 24 | 133 | 135 |
| 200 | 12 | 158 | 148 |
| 400 | 6 | 155 | 153 |

The analgesic activity of the substance is clearly demonstrated by the data above, which show that upon an increase of the dose of UP 83, the animals are capable of withstanding a greater pressure.

For the purpose of completing the study of the analgesic activity of UP 83, an investigation has been conducted to determine the antipyretic action in the rabbit, by causing a rise in body temperature by injection of pyrexal. With eighteen animals, UP 83, administered by the oral route in increasing doses up to 400 mg./kg., has shown no antipyretic activity.

In conclusion, the most important property of UP 83 exhibited in pharmacological studies, is the anti-inflammatory activity. This activity, on the basis of tests conducted, is noted at every stage of the inflammation insofar as excellent results have been obtained, not only with the rat's paw edema caused by dextran, and carrageenin, but also with the pleurisy caused by silver nitrate or by Evan's blue and with induced peritonitis. In every instance, the activity is at least equal, and at times superior, to the activity of phenylbutazone and aspirin.

The anti-inflammatory activity is accompanied by a demonstrable analgesic effect which is superior to that of aspirin and the same order of activity of phenylbutazone. Up 83 does not exhibit any antipyretic activity and does not cause secondary and side effects. It is free from cardiovascular action, free from any action on the central nervous system and free from respiratory depressant action. It should be noted that UP 83 causes some ulcers but only at very high doses and no ulcers have resulted with lower doses, which are still clearly effective. This property constitutes a substantial superiority over other anti-inflammatory agents known in the art, such as, the steroids, phenylbutazone and indomethacin.

By way of summary, UP 83 is an excellent anti-inflammatory agent different from the steroids in chemical structure, with constant activity. If one compares the active doses and the spectrum of activity, UP 83 is superior to all the known anti-inflammatory agents of structure different from the steroids.

II. TOXICOLOGICAL STUDIES

The chronic toxicity of UP 83 has been determined in the rat and in the dog and the acute toxicity has been determined in mice, rats and guinea pigs.

A. Chronic toxicity (1) IN THE RAT

Four groups are utilized of ten animals each of each sex, that is, a total of eight groups of animals, and one group of each sex is kept as a control. The remaining groups are administered respectively doses of (A) 25, (B) 100 and (C) 200 mg./kg. daily, six days out of seven for a period of four months. The results are tabulated below:

| | Control | A | B | C |
|---|---|---|---|---|
| Dose (mg./kg.) | 0 | 25 | 100 | 200 |
| Mortality: | | | | |
| ♂ | 1 | 1 | 3 | 4 |
| ♀ | 2 | 2 | 3 | 3 |

The toxicity of the substance is manifestly very low and the mortality rate is the same as the control animals at least at the lower dose of 25 mg./kg. At the higher dosages of 100 and 200 mg./kg. the number of animals which die is only slightly greater.

The growth of the surviving animals is normal. Biological studies as well as hematological examination, autopsies, histological examination of the liver, spleen, stomach, kidneys, heart, suprarenals, ovaries and testicles have shown nothing abnormal.

(2) IN THE DOG

Five dogs are administered one pill containing 250 mg. of UP 83 per kg. of body weight daily, for a period of six days out of seven, for three months. The growth, autopsies and histological studies have not shown anything abnormal.

B. Acute toxicity (1) IN THE MICE (a) Active substance:

Oral route _____ DL 50=455 mg./kg.
I.P. route _____ DL 50=250 mg./kg.
I.V. route _____ DL 50=152 mg./kg.

(b) Treatment by pill:

Oral route _____ DL 50=460 mg./kg.

(2) IN THE RAT (a) Active substance:

Oral route _____ DL 50=650 mg./kg.
I.P. route _____ DL 50=100 mg./kg.

(b) Treatment by pill:

Oral route _____ DL 50=660 mg./kg.

(3) IN THE GUINEA PIG

Minimum lethal dose by the I.V. route is 174 mg./kg.

By way of summary, toxicological studies of UP 83 show that the substance is little toxic. The small differences between the different lethal doses according to the route of administration, demonstrate that an excellent intestinal reabsorption of the substance takes place. The terminal treatment indicates a comparable toxicity. In every case, the toxicity is distinct, the symptoms are clear and do not become evident unless the doses administered are in the lethal range. Treatment with UP 83 is never accompanied by symptoms of delayed toxicity.

III. STUDIES OF TERATOGENIC ACTIVITY

For the purpose of this study, UP 83 has been administered orally to pregnant mice, rats and rabbits in doses varying from 25 to 200 mg./kg. daily. The results are tabulated below:

|  | Control | A | B | C |
|---|---|---|---|---|
| Mice: |  |  |  |  |
| Number of animals | 300 | 40 | 40 | 30 |
| Doses in mg./kg | 0 | 25 | 100 | 200 |
| Rats: |  |  |  |  |
| Number of animals | 200 | 40 | 50 | 100 |
| Doses in mg./kg | 0 | 25 | 100 | 200 |
| Rabbits: |  |  |  |  |
| Number of animals | 75 | 20 | 20 | 30 |
| Doses in mg./kg | 0 | 10 | 50 | 100 |

In every instance, no deformity and no constitutional irregularity have been noted, not only in the fetus, but also in the young animals and it is safe to conclude that UP 83 is free from teratogenic action.

The substance has been tested clinically and has exhibited analgesic and anti-inflammatory activity, and when administered orally, has given satisfactory results in the treatment of the following different conditions:

inflammatory arthritis (polyarthritis, spondylarthritis, inflammatory rheumatism of different origin);
arthritides of joints of the vertebral column;
rheumatic pains and neuralgia (lumbago, torticollis);
gout;
local inflammatory syndromes, for instance, phlebitis.

The product has been administered in the form of pills containing 0.250 gm. of active ingredient and the dosage has been between 2 and 8 pills per day and, according to the condition of the patient, the length of the treatment has varied between 4 days and several months.

The chemical results confirm the pharmacological studies of the substance, that is, that UP 83 exhibits remarkable anti-inflammatory activity and a substantial analgesic activity which is essentially constant and reproducible.

The interest of the substance resides particularly in its activity, equal or superior, to other anti-inflammatory agent; in the possibility of reducing the amount of cortisone being administered in inflammatory conditions and in the excellent tolerance in the general condition of the patient, not only cutaneously and in the blood, but also in the digestive system.

The experimental work reported hereinabove permits one to conclude that UP 83 exhibits excellent analgesic and anti-inflammatory activity, an excellent tolerance and that the substance is the drug of choice in every condition in which the patient has inflammation and pain, and particularly in rheumatic conditions.

The clinical experiments reported for UP 83 and 2-(2,3-xylylamino)-nicotinic acid, confirm the therapeutic value of the substances of this application. The compounds of this invention may be used together with colchicine and may be used in the treatment of gout, thus avoiding the use of corticosteroids with the unavoidable side effects of this treatment, which has been the best treatment of gout known so far.

The effects of the compounds of the invention on chronic rheumatoid polyarthritis have been remarkable although these conditions are very difficult to treat. The same effect has been noted with certain cases of recurrent polyarthritis.

What is claimed is:

1. An analgesic and anti-inflammatory composition consisting essentially of an effective amount of 2-(2,3-xylylamino)-nicotinic acid or a water soluble non-toxic salt thereof and a pharmaceutically acceptable carrier.

References Cited

UNITED STATES PATENTS 3,337,570   8/1967   Sherlock et al. _____ 260—295.5

ALBERT T. MEYERS, Primary Examiner

STANLEY J. FRIEDMAN, Assistant Examiner